(No Model.)
D. C. WETSEL.
NUT LOCK.
No. 536,498.  Patented Mar. 26, 1895.
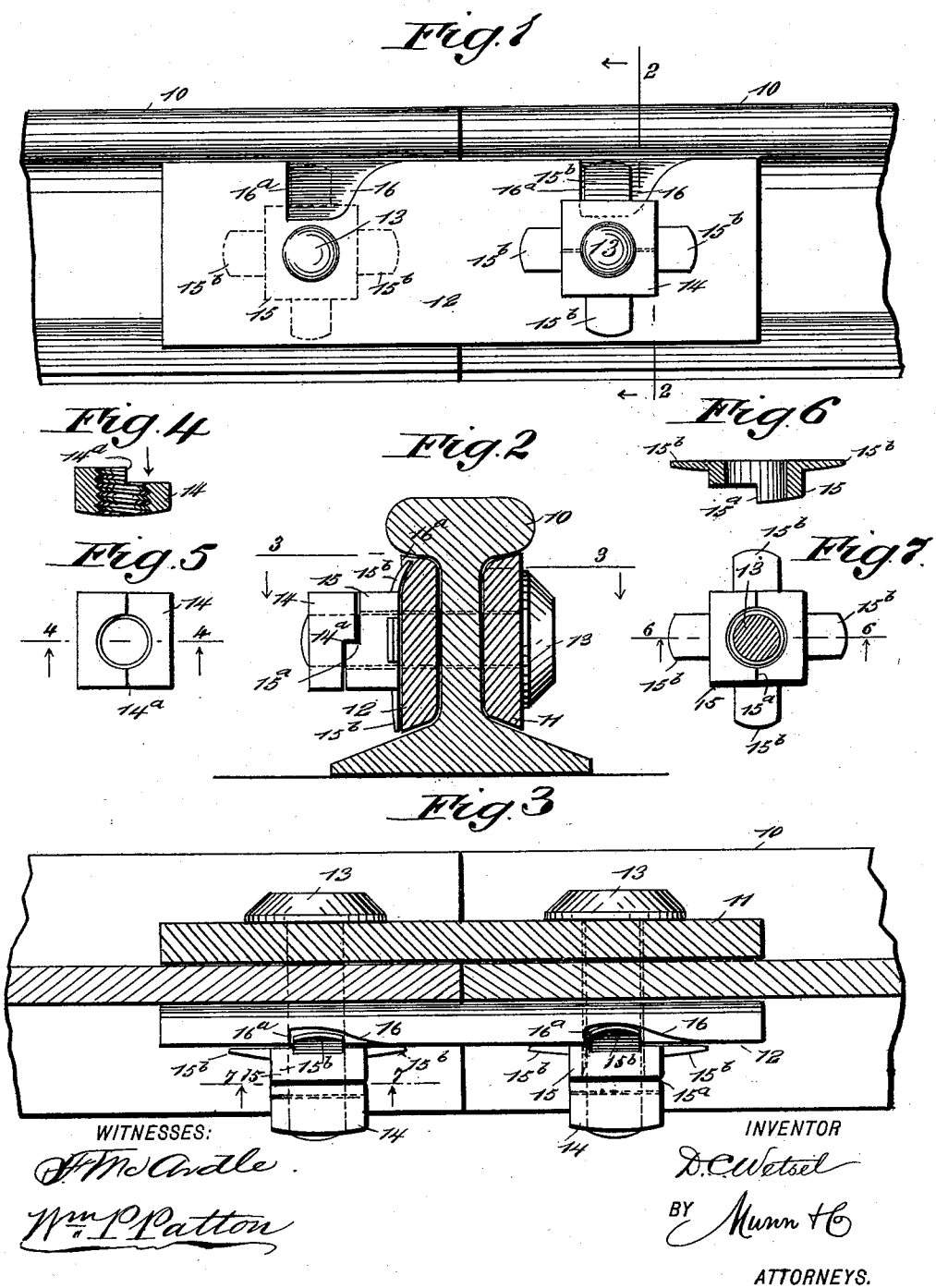
WITNESSES:
INVENTOR
ATTORNEYS.

UNITED STATES PATENT OFFICE.

DAVID C. WETSEL, OF CARROLLTON, PENNSYLVANIA.

NUT-LOCK.

SPECIFICATION forming part of Letters Patent No. 536,498, dated March 26, 1895.

Application filed September 14, 1894. Serial No. 522,983. (No model.)

*To all whom it may concern:*

Be it known that I, DAVID C. WETSEL, of Carrollton, in the county of Cambria and State of Pennsylvania, have invented a new and Improved Nut-Lock, of which the following is a full, clear, and exact description.

My invention relates to an improved nut lock, which is particularly well adapted for the secure locking of nuts on fish plate bolts for railroad tracks, the objects being to provide a simple and inexpensive device of the character indicated, which will be adapted for a convenient and quick adjustment to lock the nut on a bolt so as to prevent it from accidentally unscrewing, and that will permit the nut to be partly or entirely removed from the bolt, without injury to it or the nut lock, which is adapted for reuse as occasion may require.

To these ends my invention consists in the peculiar construction and combination of parts, as is hereinafter described and claimed.

Reference is to be had to the accompanying drawings, forming a part of this specification, in which similar letters of reference indicate corresponding parts in all the views.

Figure 1 is a side view of two track rail end portions at their joint, a fish plate, two transverse bolts, two nuts therefor embodying part of the improvement, and the improved nut locks for said nuts shown by full and dotted lines, in locked adjustment bearing on the fish plate. Fig. 2 is a transverse sectional view on the line 2—2 in Fig. 1. Fig. 3 is a partly sectional plan view of parts shown in Figs. 1 and 2, on the line 3—3 in Fig. 2. Fig. 4 is a transverse sectional view of one of the nuts for the fish plate bolts taken on the line 4—4 in Fig. 5. Fig. 5 is an inner end view of the nut shown in Fig. 4 in the direction of an arrow in said figure. Fig. 6 is a detached transverse sectional view of the improved nut lock on the line 6—6 in Fig. 7; and Fig. 7 is a transverse sectional view of one of the fish plate bolts, and an outer end view of the improved nut lock thereon, the section being taken on the line 7—7 in Fig. 3.

The improved nut lock is generally applicable to retain a nut on a bolt, when the part engaged by the nut lock is sufficiently rigid to retain the locking device in locked connection therewith.

For the purpose of illustrating its application, the improvement is represented in connection with two railroad track rails, and two fish plates, the improved nut lock being specially well adapted for service, in connection with the bolts, and nuts employed to hold the fish plates clamped against the webs of the rails, when the latter are aligned to form a railroad track.

In the drawings 10, 10, indicate two track rails of the usual T-head pattern, which rail end portions are shown aligned, and in loose contact at adjacent ends, in Figs. 1 and 3.

The fish plates 11, 12, are both formed as elongated plates of suitable dimensions for effective service, and they together with the rails 10 are transversely perforated at appropriate points near the ends of the rails as usual, for the reception of the clamping bolts 13. A single nut 14 is provided for each bolt 13, which nuts are preferably made square in contour as shown in Fig. 5. The faces of the similar nuts 14, that are innermost when the nuts are screwed on the bolts, are each offset to form a right angular shoulder 14$^a$, the latter being produced by reducing the thickness of the nut on a line across the center of said nut, and parallel with two opposite sides of the same, the shoulder being proportioned in depth to adapt it for a secure engagement with the nut locking piece 15.

As clearly indicated in Figs. 6 and 7, the nut lock proper comprises a preferably square block 15, having similar dimensions with the nut 14 and provided with a shoulder 15$^a$, that is formed across the center of the block parallel with two opposite sides, this shoulder being equal in depth to the shoulder 14$^a$ so that the ends of the nut and block 15 having the shoulders formed on them, will fit one against the other and have a close contact throughout their areas, if made to impinge, as shown in Figs. 2 and 3.

The fish plate 11 is designed to receive the heads of the bolts 13, and the plate 12 to have contact with the adjacent surface of the locking devices when the latter are strung on the bolts, the blocks 15 being centrally and circularly apertured to adapt them to freely slide on the bolts. Four wedge like wings 15$^b$ are projected one from each side of the block 15, as is clearly shown in Fig. 7, these projections having their faces that impinge the side of the fish plate 12 aligned with the end of the block 15 that has a like contact with the fish plate named. The wings 15$^b$ are of equal length and are preferably rounded on their thin outer terminals as shown in Figs. 1 and 7.

Directly above each of the bolt receiving perforations in the fish plate 12, a detent recess 16 is formed, these similar shallow cavities having a sloped bottom in each one, which inclined surfaces terminate at their lowest point in upright walls 16$^a$, that in service afford locking shoulders for the impinge of a side edge on one of the wings 15$^b$ on each block 15.

In applying the improved nut lock to a bolt for securing a nut 14 from unscrewing, the block 15 is slid over the projecting threaded end of a clamping bolt such as 13 that has been inserted through the fish plates 11, 12, and the intervening web of the T-rail 10. The nut 14 is now secured on the bolt, and caused to have an interlocking engagement of its shoulder 14$^a$, with the similar shoulder on the block 15, which will adapt the nut when rotated so as to further screw it on the bolt body, to press the block toward the fish plate and also rotate it. The impinge of the nut locking device against the fish plate 12 that results from the rotation of the nut in a proper direction, will be adapted to locate one of the wings 15$^b$ over the recess 16 and have one edge of said wing disposed above the shoulder 16$^a$. The nut 14 should have been drawn as tightly as is necessary to properly clamp the fish plates against the rails, when the wing is located as explained. The secure locking of the block 15 and nut with which it is interlocked, is now effected by simply bending the wing that is above the recess 16, down into said recess, thereby causing the edge of the wing to engage the shoulder 16$^a$, as said shoulder is formed at the side of the recess, which will adapt it to obstruct an accidental reverse rotation of the nut which would unscrew it.

It will be seen that if the nuts which retain the fish plates in a clamped condition by their engagement with the bolts 13, are to be relaxed or removed, this can be readily effected with a suitable wrench, which will force the wing that has engaged a shoulder 16$^a$ up the sloped bottom of the recess 16 and straighten said wing, it being necessary for the block 15 and its wings that said parts be formed of iron or steel that will stand bending in the manner stated.

As the improvement enables the secure retention of a single nut on each bolt, and is capable of reuse as has been explained, it will be evident that it will accomplish in an inexpensive manner, the desired locking of nuts on fish plate bolts to prevent their relaxation by the percussive action of rolling stock on the railroad.

Having thus described my invention, I claim as new and desire to secure by Letters Patent—

1. The combination, with a bolt, and a nut having a shoulder across the center at one end, of a locking block shouldered to fit against the shouldered end of the nut, and having a radial wing at each side, and a fish plate recessed on one side near the bolt and adapted to receive one of the wings, substantially as described.

2. The combination, with a bolt, a nut therefor shouldered at the center across one end in parallel with two sides, of a locking block shaped like the nut, and shouldered on one end to fit against the shouldered end of said nut, wings radially projected one from each side of the block, and a fish plate having a single recess shouldered at one side edge and sloped at the bottom toward said edge against which one of the wings will impinge if bent toward the plate, substantially as described.

DAVID C. WETSEL.

Witnesses:
JOSEPH V. MAUCHER,
CHAS. A. SHARBAUGH.